United States Patent

Chidamparam et al.

[11] Patent Number: 5,823,287
[45] Date of Patent: Oct. 20, 1998

[54] MOUNTING ASSEMBLY FOR A TRANSMISSION CROSS MEMBER OF A MOTOR VEHICLE

[75] Inventors: Paramesw Chidamparam, Madison Heights; Dattatrey N. Gawaskar, Farmington Hills; Robert D. Blankenship, Novi; Leland B. Clark, Utica, all of Mich.

[73] Assignee: Chrysler Corporation, Auburn Hills, Mich.

[21] Appl. No.: 811,461

[22] Filed: Mar. 3, 1997

[51] Int. Cl.⁶ ............................ B60K 17/00; B62D 21/02
[52] U.S. Cl. ................... 180/377; 180/312; 280/781; 280/800
[58] Field of Search ...................... 180/377, 312, 180/292; 280/781, 785, 796, 800, 788; 296/204, 30

[56] References Cited

U.S. PATENT DOCUMENTS

| | | | |
|---|---|---|---|
| 1,435,480 | 11/1922 | Kerr | 180/377 |
| 1,621,275 | 3/1927 | Reeves | 280/785 |
| 4,406,343 | 9/1983 | Harasaki | 180/297 |
| 4,420,060 | 12/1983 | Kakimoto | 180/300 |
| 4,531,761 | 7/1985 | Von Sivers | 280/785 |
| 4,744,539 | 5/1988 | Stimeling | 248/638 |
| 5,078,230 | 1/1992 | Hasuike | 180/291 |
| 5,183,286 | 2/1993 | Ayabe | 280/781 |
| 5,222,573 | 6/1993 | Kameda et al. | 180/297 |
| 5,454,453 | 10/1995 | Meyer et al. | 180/377 |

FOREIGN PATENT DOCUMENTS

| | | | |
|---|---|---|---|
| 4-169379 | 6/1992 | Japan | 280/781 |
| 4-215565 | 8/1992 | Japan | 280/788 |
| 5-77764 | 3/1993 | Japan | 280/781 |
| 6-99845 | 4/1994 | Japan | 280/781 |

*Primary Examiner*—Peter C. English

[57] ABSTRACT

A mounting assembly mounts each end of a transmission cross member to a body rail. The mounting assembly includes a cross member sleeve which reduces pre-compression buckling of the transmission cross member. A rail sleeve stiffens the local area of the body rail while adding little weight. A cover plate is secured to the body rail via welding and to the rail sleeve with two bolts. A body rail bracket is also fixedly secured between the cross member sleeve and the body rail to increase the stiffness thereof. The increased stiffness reduces vibrational noise generated by a transmission of a motor vehicle.

16 Claims, 3 Drawing Sheets

MOUNTING ASSEMBLY FOR A TRANSMISSION CROSS MEMBER OF A MOTOR VEHICLE

BACKGROUND OF THE INVENTION

1. Field of the Invention

The invention relates to a support structure. More specifically, the invention relates to a support structure for transmissions of motor vehicles that dampen vibrations.

2. Description of Related Art

Transmissions for motor vehicles generate vibrational noise. This vibrational noise is transmitted into a passenger compartment and to the passengers of the motor vehicle. The perception of the quality of the motor vehicle is reduced due to these vibrations.

A type of attachment for a cross member of a transmission is disclosed in U.S. Pat. No. 5,454,453, issued to Meyer, et al. on Oct. 3, 1995. In this reference, a bracket is designed to allow the cross member to move during an imposition of an excessive load. The bracket includes a slot through which a pin extends connecting the cross member to the bracket. Although this bracket is capable of absorbing large forces at low frequencies, this bracket is not capable of absorbing or attenuating noise transmitted through the cross member having a higher frequency typically associated with the noise generated by moving parts inside the transmission. Therefore, there is a need for a support structure for supporting a transmission in a motor vehicle which dampens or attenuates noise vibrations generated by the transmission preventing those vibrations from passing through the frame structure into the passenger compartment of the motor vehicle.

SUMMARY OF THE INVENTION

A mounting assembly for mounting an end of a transmission cross member to a body rail of a motor vehicle is disclosed. The mounting assembly includes a cross member sleeve fixedly secured to the end of the transmission cross member and the body rail. A rail sleeve is fixedly secured to the body rail. A cover plate is fixedly secured to the rail sleeve and the body rail.

The mounting assembly provides the advantage of reducing the amount of noise transmitted from the transmission through the transmission cross member to the body rail of the motor vehicle. This invention also provides the advantage of stiffening the body rails of the motor vehicle to reduce the noise generated thereby. This invention provides a further advantage of stiffening the body rails of the motor vehicle while adding little weight to the motor vehicle.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figures 1, 2:
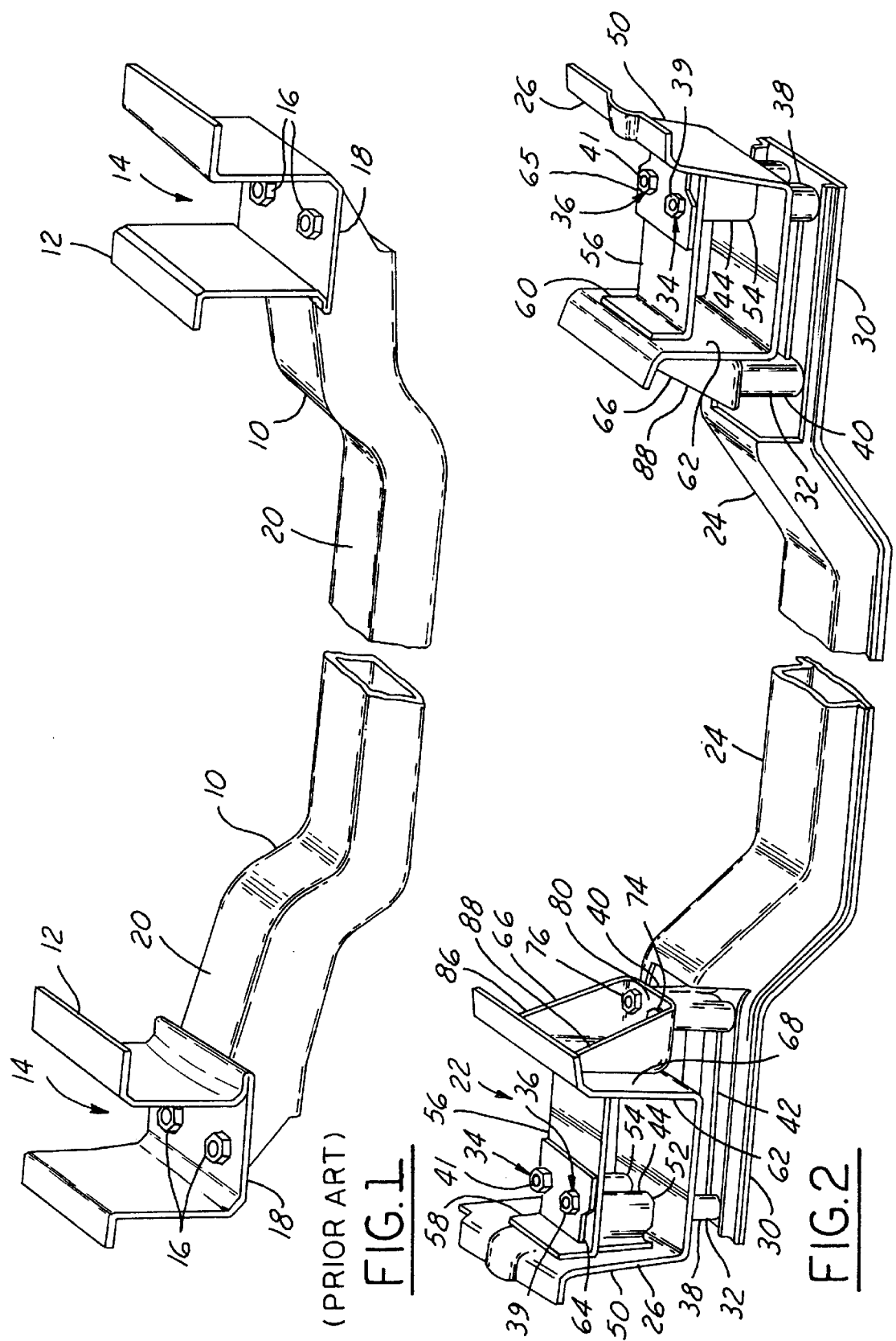
FIG. 1 is a perspective view, partially cut away, of a prior art connection between a transmission cross member and a body rail.
FIG. 2 is a perspective view, partially cut away, of a mounting assembly mounting a transmission cross member to a body rail, according to one embodiment of the invention.

A prior art representation of a transmission cross member 10 connected to a body rail 12 using a mounting assembly 14 is shown in FIG. 1. The mounting assembly 14 includes at least two bolts 16 which extend through the transmission cross member 10 and the body rail 12. The bolts 16 secure the bottom surface 18 of the body rail 12 to the top surface 20 of the transmission cross member 10.

Figure 3:
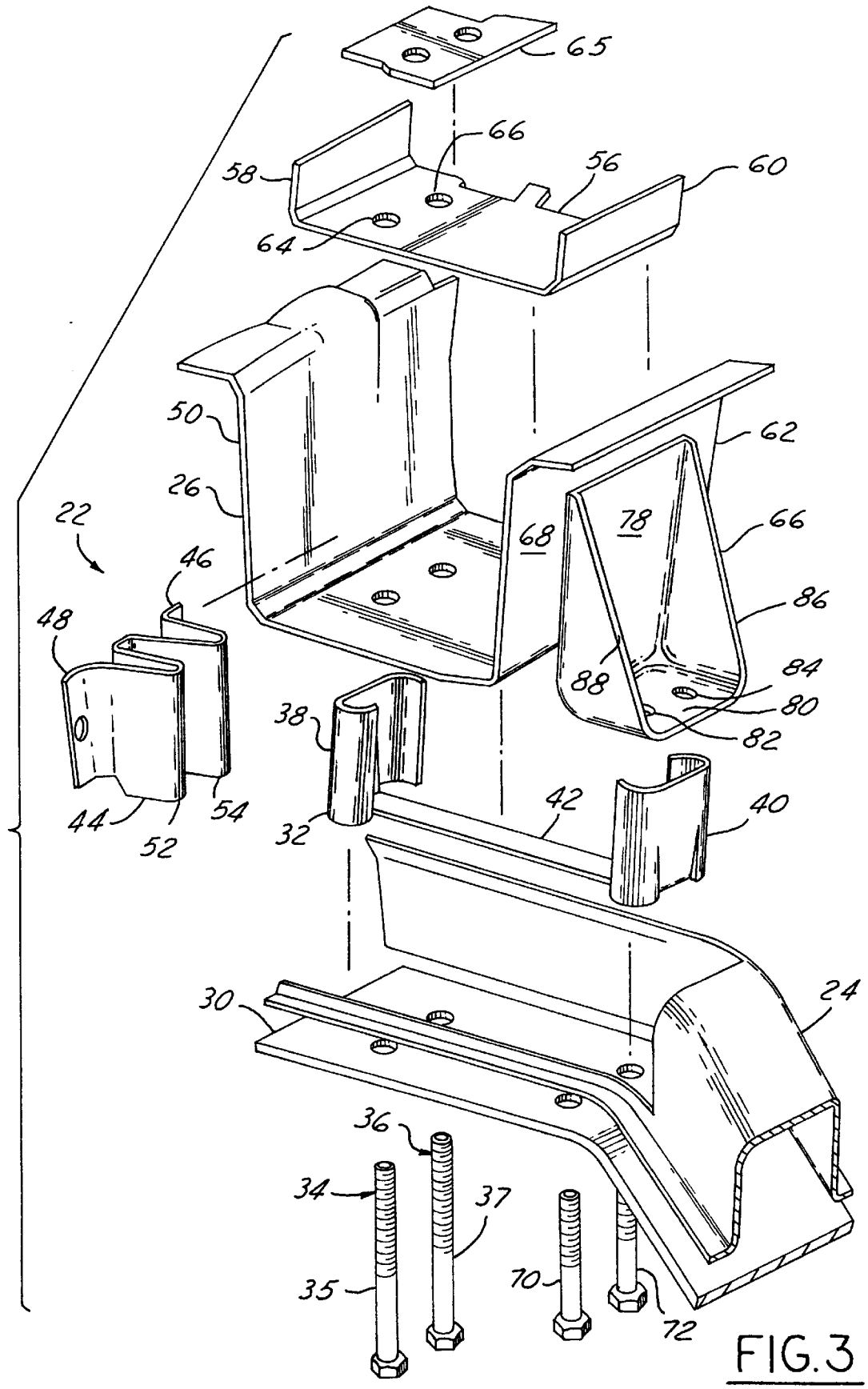
FIG. 3 is an exploded view of the mounting assembly according to the invention.

Referring to FIGS. 2 and 3, a mounting assembly according to the invention is generally indicated at 22. The mounting assembly 22 secures a transmission cross member 24, similar to the transmission cross member 10 of the prior art, to a body rail 26, similar to the body rail 12 of the prior art. The transmission cross member 24 supports a transmission (not shown) between two body rails 26. Because the mounting assembly for each of the body rails 26 is identical, the remainder of this disclosure will refer only to the mounting assembly 22 on the driver's side of the motor vehicle. It should be appreciated by those skilled in the art that the mirror mounting assembly 22 on the passenger side of the motor vehicle is similar in configuration and shall not be discussed independently.

When mounting an end 30 of the transmission cross member 24, a cross member sleeve generally indicated at 32, is fixedly secured to the end 30 of the transmission cross member 24. The cross member sleeve 32 is also fixedly secured to the body rail 26. The cross member sleeve 32 is fixedly secured to both the end 30 of the transmission cross member 24 and the body rail 26 using fasteners 34, 36. In one embodiment, the fasteners 34, 36 are two bolts 35, 37 and nuts 39, 41. The cross member sleeve 32 includes a first sleeve portion 38 and a second sleeve portion 40. A bridge portion 42, best seen in FIG. 3, extends between the first 38 and second 40 sleeve portions. The cross member sleeve 32 acts as a locator ensuring the inside of the transmission cross member 24 does not buckle due to pre-compression inside the transmission cross member 24.

The mounting assembly 22 further includes a rail sleeve 44. The rail sleeve 44 is fixedly secured to the body rail 26. More specifically, the rail sleeve 44 includes two flanges 46, 48 which are welded to a side wall 50 of the body rail 26. The rail sleeve 44 is corrugated having at least two portions 52, 54 extending out away from the side wall 50 of the body rail 26 into the center of the body rail 26. Each of the bolts 35, 37 extends into one of the portions 52, 54. The rail sleeve 44 is designed such that the effective stiffness of the bolts 35, 37 is increased. By increasing the effective stiffness of the bolts 35, 37, the stiffness of the mounting assembly 22 increases, thereby reducing the amount of vibrations transmitted. The rail sleeve 44 is corrugated to reduce the overall weight of the body rail 26. More specifically, an elongated, solid spacer may effectively increase the stiffness of the bolts 35, 37. The elongated spacers will, however, substantially increase the weight of the mounting assembly 22. Therefore, the corrugated rail sleeve 44 is used in the preferred embodiment.

A cover plate 56 is fixedly secured to the rail sleeve 44 and the body rail 26. More specifically, the cover plate 56 includes a first end flange 58 and a second end flange 60. The first end flange 58 is welded to side wall 50 of the body rail 26. The second end flange 60 is welded to a second side wall 62 of the body rail 26. The cover plate 56 is welded to the body rail 26 in such a position that it rests on the rail sleeve 44. The cover plate 56 includes two holes 64, 66 allowing the two bolts 35, 37 to pass therethrough. The cover plate 56 provides an additional shear plane for the two bolts 35, 37.

A floating, tapping plate 65 is secured to the cover plate 56 by the two bolts 35, 37. The floating, tapping plate 65 is used to ensure that the bolts 35, 37 are located readily during assembly. More specifically, the floating, tapping plate 65 accounts for manufacturing variances. Further, the floating, tapping plate 65 ensures that the nuts are fixedly secured to the bolts 35, 37. The floating, tapping plate 65 is disposed adjacent the cover plate 56.

A body rail bracket 66 is fixedly secured to the cross member sleeve 32 and the body rail 26. More specifically, the body rail bracket 66 is welded to an outer surface 68 of the second side wall 62 of the body rail 26. The body rail bracket 66 is also fastened to the second sleeve portion 40 of the cross member sleeve 32 by at least one bolt 70. In one embodiment, this second fastener includes two bolts 70, 72 which extend through the transmission cross member 24, the second sleeve portion 40 of the cross member sleeve 32 and the body rail bracket 66. In one embodiment, the bolts 70, 72 are fastened to the body rail bracket 66, which has a stamped out extending portion, by nuts 74, 76. The body rail bracket 66 includes a first surface 78, welded to the outer surface 68 of the second side wall 62 of the body rail 26, and a second surface 80 extending out from the first surface 78 substantially perpendicularly thereto. The second surface 80 includes two holes 82, 84 through which the two bolts 70, 72 extend therethrough. The body rail bracket 66 also includes two side surfaces 86, 88 which extend perpendicularly to both the first surface 78 and the second surface 80. The body rail bracket 66 effectively reduces the span of the transmission cross member 24 to increase the stiffness thereof. By increasing the stiffness of the transmission cross member 24, less vibrational noise is transmitted to the passenger compartment of the motor vehicle.

Figure 4:
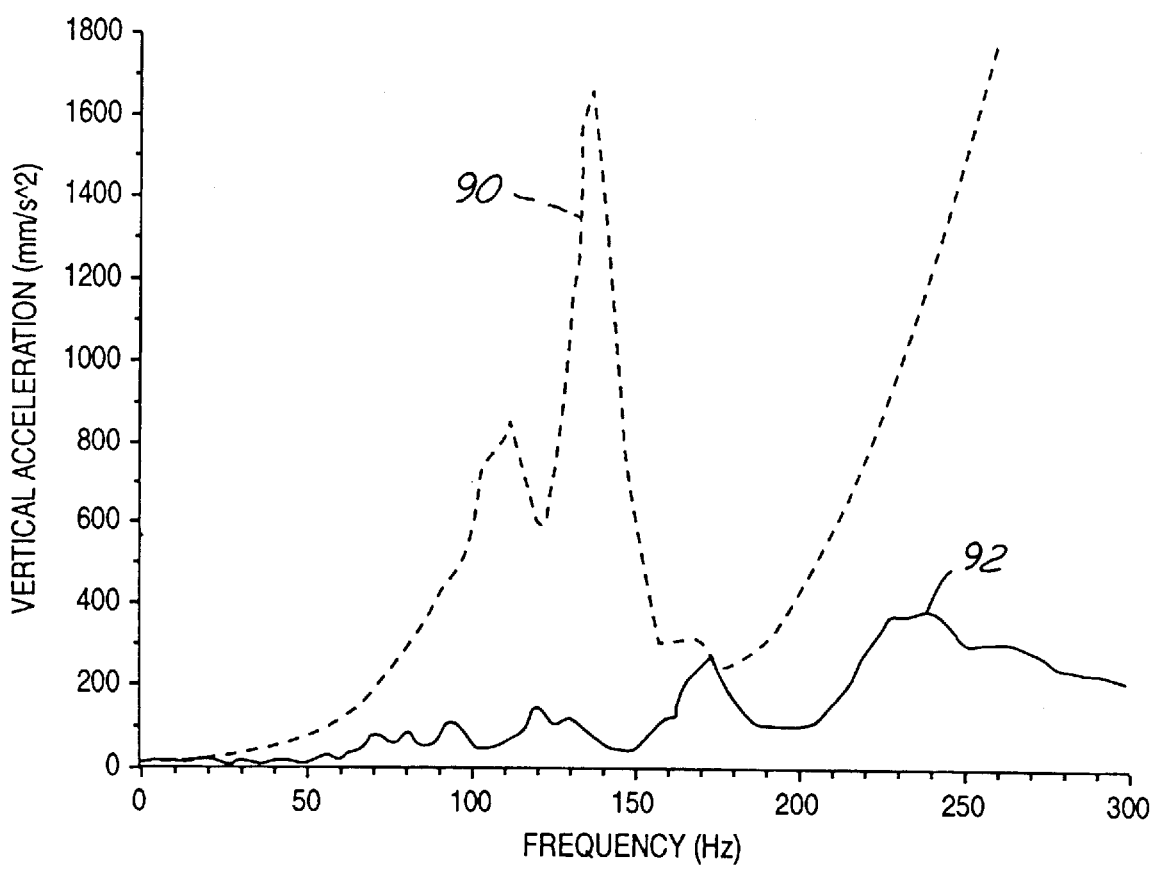
FIG. 4 is a graph comparing the acceleration per frequency of the mounting assembly according to the invention, and a mounting assembly of the prior art.

The vibrational noise generated by the transmission is shown in FIG. 4. The dashed line 90 represents accelerations per frequency generated by the mounting assembly 14 of the prior art, shown in FIG. 1. The solid line 92 represents the vibrational noise generated by the mounting assembly 22 of the invention. The amount of vibrational noise generated is substantially less than that which has been generated by those of the prior art.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A mounting assembly for mounting an end of a transmission cross member to a body rail of a motor vehicle, said mounting assembly comprising:

a cross member sleeve fixedly secured to the end of the transmission cross member and the body rail;

a rail sleeve fixedly secured to the body rail; and a cover plate fixedly secured to said rail sleeve and the body rail;

wherein said rail sleeve is corrugated.

2. A mounting assembly for mounting an end of a transmission cross member to a body rail of a motor vehicle, said mounting assembly comprising:

a cross member sleeve fixedly secured to the end of the transmission cross member and the body rail;

a rail sleeve fixedly secured to the body rail; and a cover plate fixedly secured to said rail sleeve and the body rail;

wherein said cross member sleeve includes a first sleeve portion and a second sleeve portion, each receiving a respective fastener therethrough.

3. A mounting assembly as set forth in claim 2 wherein said first sleeve portion and said second sleeve portion extend upwardly from the end of the transmission cross member.

4. A mounting assembly as set forth in claim 2 wherein said cross member sleeve further includes a bridge portion extending between said first sleeve portion and said second sleeve portion.

5. A mounting assembly as set forth in claim 4 wherein one of said fasteners extends through the transmission cross member, said cross member sleeve, said rail sleeve, the body rail and said cover plate.

6. A mounting assembly as set forth in claim 4 wherein a pair of fasteners extends through said transmission cross member, said first sleeve portion of said cross member sleeve, said body rail, said cover plate and through respective holes in a floating tapping plate, said floating tapping plate being disposed adjacent to said cover plate and fixedly secured thereto by said fasteners.

7. A mounting assembly for mounting an end of a transmission cross member to a body rail of a motor vehicle, said mounting assembly comprising:

a cross member sleeve fixedly secured to the end of the transmission cross member and the body rail:

a rail sleeve fixedly secured to the body rail;

a cover plate fixedly secured to said rail sleeve and the body rail; and a body rail bracket fixedly secured to said cross member sleeve and the body rail.

8. A mounting assembly as set forth in claim 7 wherein said body rail bracket is welded to the body rail.

9. A mounting assembly for mounting an end of a transmission cross member to a body rail of a motor vehicle, the body rail having a stiffness, said mounting assembly comprising:

a cross member sleeve fixedly secured to the end of the transmission cross member and the body rail to reduce pre-compression buckling;

a rail sleeve fixedly secured to the body rail;

a cover plate fixedly secured to said rail sleeve and the body rail; and a body rail bracket fixedly secured to said cross member sleeve and the body rail to increase the stiffness of the body rail.

10. A mounting assembly as set forth in claim 9 wherein said rail sleeve is corrugated.

11. A mounting assembly for mounting an end of a transmission cross member to a body rail of a motor vehicle, the body rail having a stiffness, said mounting assembly comprising:

a cross member sleeve fixedly secured to the end of the transmission cross member and the body rail, said cross member sleeve including a first sleeve portion and a second sleeve portion;

a rail sleeve fixedly secured to the body rail, said rail sleeve being corrugated to reduce weight and maintain strength;

a cover plate fixedly secured to said rail sleeve and the body rail; and a body rail bracket fixedly secured to said cross member sleeve and the body rail to increase the stiffness of the body rail.

12. A mounting assembly as set forth in claim 11 wherein said cross member sleeve further includes a bridge portion extending between said first sleeve portion and said second sleeve portion.

13. A mounting assembly as set forth in claim 12 including a fastener extending through the transmission cross member, said cross member sleeve, said rail sleeve, the body rail, and said cover plate.

14. A mounting assembly as set forth in claim 13 wherein said fastener includes a bolt and a nut.

15. A mounting assembly as set forth in claim 14 wherein a bracket fastener extends through the transmission cross member, said second sleeve portion and said body rail bracket.

16. A mounting assembly as set forth in claim 15 wherein said bracket fastener includes a second bolt and a second nut.

* * * * *